United States Patent [19]
Greco

[11] Patent Number: 4,630,502
[45] Date of Patent: Dec. 23, 1986

[54] FLAT CROSS BAR FOR FREESTYLE BICYCLE HANDLEBAR

[75] Inventor: Mark Greco, Kenosha, Wis.

[73] Assignee: Schwinn Bicycle Company, Chicago, Ill.

[21] Appl. No.: 772,552

[22] Filed: Sep. 4, 1985

[51] Int. Cl.⁴ .............................................. B62K 21/12
[52] U.S. Cl. .................................. 74/551.1; D12/178
[58] Field of Search ........................... 74/551.1, 551.9; 280/289 H; D12/178

[56] References Cited
U.S. PATENT DOCUMENTS
1,738,855  12/1929  Thompson ..................... 74/551.1
2,059,669  11/1936  Skoog ............................. 74/551.1

FOREIGN PATENT DOCUMENTS
1036064  4/1951  France ............................. 74/551.1

Primary Examiner—Henry Bennett
Attorney, Agent, or Firm—McCaleb, Luccas & Brugman

[57] ABSTRACT

A handlebar for a bicycle with a cross-bar having a flat upper surface to support a rider during freestyle maneuvers.

4 Claims, 6 Drawing Figures

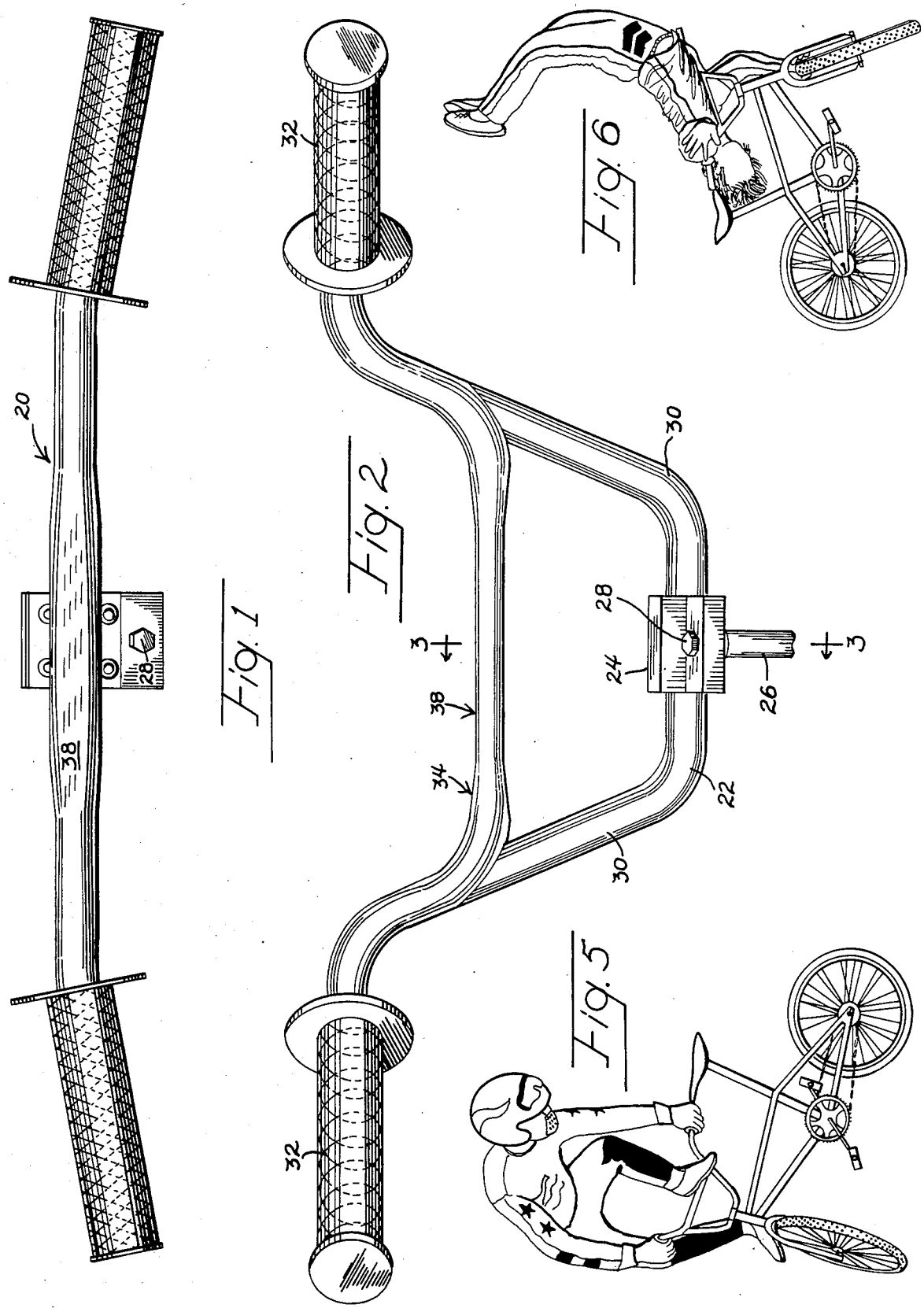

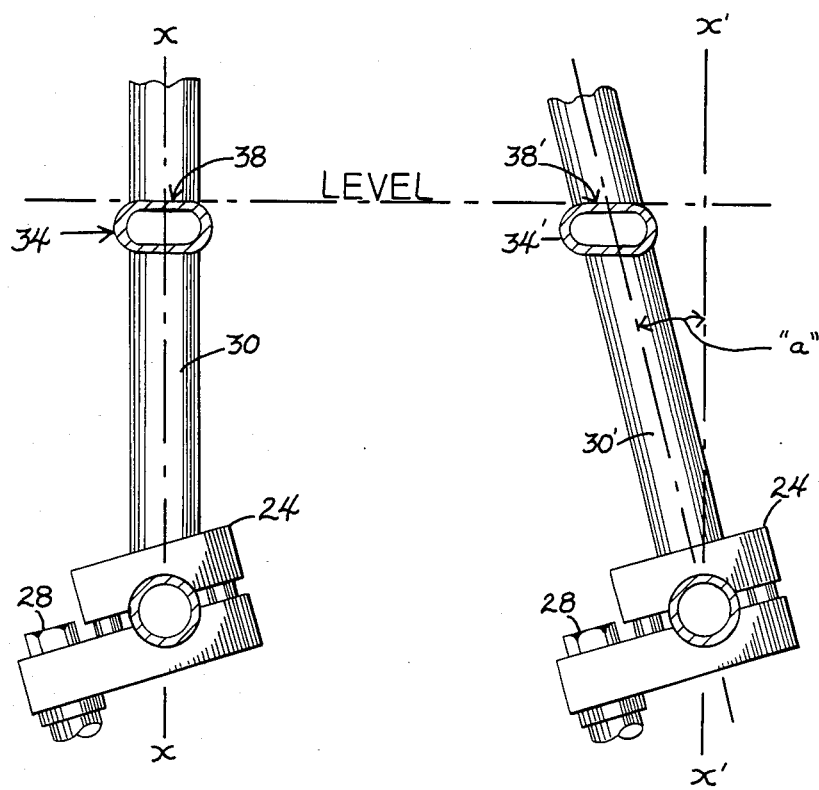

FLAT CROSS BAR FOR FREESTYLE BICYCLE HANDLEBAR

BACKGROUND OF THE INVENTION

This invention relates to a special kind of sports bicycle called a Freestyle or Freestyle BMX Bike. Typically, these have a low profile with wheel diameters of 20 inches or less and are extremely rugged. They are used for sprinting, racing, and a wide variety of trick maneuvers such as climbing an inclined ramp and dropping to a track below, riding or balancing the bike while tilted upright on its rear wheel, and riding or coasting while seated or standing on the handlebar cross-bar.

Among the maneuvers using the handlebar cross-bar for support are: balancing the bike while the rider straddles the cross-bar with the front wheel turned at right angles to the frame; riding the bike while seated on the cross-bar and facing backward with the feet turning the pedals; balancing the bike with the rider in a prone position and his chest on the cross-bar with his hands on the front tire turned at right angles to the frame; seated on the cross-bar facing either forwardly or rearwardly; and as a temporary foot support while changing positions between one maneuver and another.

Among the most spectacular of these maneuvers is balancing a moving bike while the rider stands or crouches on the handlebar cross-bar. To facilitate this, some specialty bike and handlebar manufacturers provide a pair of cross-bars across the handlebar arms. These have the drawbacks of adding weight and bulk, and are awkward looking.

The conventional cross-bar on the handlebar of a freestyle bike is made of round cross-section tubular stock with a slick and shiny surface providing very little stable support for a seated or standing trick rider in maneuvers of these kinds.

SUMMARY OF THE INVENTION

The principle object of the present invention is to provide a handlebar for a freestyle bicycle having a horizontal cross-bar with a flat upper surface to provide improved support for a rider performing freestyle maneuvers on the handlebar.

BRIEF DESCRIPTION OF THE DRAWINGS

FIG. 1 is a top plan view of a freestyle bicycle handlebar illustrating one form of the present invention;

FIG. 2 is a rear elevational view of FIG. 1;

FIG. 3 is a vertical cross-section of FIG. 2 taken on line 3—3;

FIG. 4 is a view similar to FIG. 3 of another embodiment of the invention; and

FIGS. 5 and 6 are action views showing examples of maneuvers which can be performed with the present invention.

Like parts are referred to by like reference characters.

DETAILED DESCRIPTION OF THE PREFERRED EMBODIMENTS

Referring now to the specific embodiment of the invention illustrated in FIGS. 1, 2, and 3, a freestyle handlebar is generally designated 20. It has a horizontal mid section 22 held by a conventional clamp 24 and an expandable plug 26 which can be frictionally gripped in the upstanding hollow stem of a bicycle front fork by means of a tightening stud 28. A pair of upwardly and outwardly diverging arms 30, 30 extend from opposite sites of the mid section 22. These have plastic or rubber-like hand grips 32, 32.

A horizontal cross-bar 34 is connected integrally as by welding between the arms 30, 30. It has a flattened mid section 36 with a flat top supporting surface 38.

In many freestyle bicycles, the arms are upright, that is, in a vertical plane. For example, as shown in FIG. 3, the arms 30, 30 are clamped upright in a vertical plane X—X.

In other freestyle bicycles, the arms are in upright planes tilted forwardly or backwardly relative to a vertical plane. For example, as shown in the alternate embodiment of FIG. 4, the arms 30 are in an upright plane which is tilted backwardly at an angle "a" from the vertical plane X'—X'.

The top, flat, supporting surface 38 on the cross-bar 34 should be substantially level although a tilt of a few degrees forward or backward will be acceptable and still provide far more stable foot support than the line contact provided by the round cross-section of conventional single cross-arm handlebars. Where the supporting surface 38 is at a right angle to the plane of the arms 30, 30, it will be exactly level when the arms are exactly vertical as shown in FIG. 3. In the alternate embodiment of FIG. 4, the cross-bar 34' will be skewed suitably about a horizontal axis, to an oblique angle relative to the plane of the arms 30', 30' in an amount corresponding to the angle "a" so the upper flat surface 38' will be level.

While the cross-section of the cross-arm mid section is shown as a flattened circle in FIG. 3 and 4 because of convenience in manufacturing, any other section having a flat, upper supporting surface may be utilized.

In use, as shown in FIGS. 5 and 6, the flat, level top surface 38 or 38' on the cross-bar provides improved support for a wide range of serious freestyle maneuvers. FIG. 5 illustrates a performer using a cross-bar as a foot support during a dynamic balancing act. FIG. 6 shows a performer in a backward, prone position with his chest supported on the cross-bar in another balancing act. It is especially useful in supporting both feet of a performer while standing or crouching during a balancing or coasting maneuver.

While particular examples of the present invention have been shown and described, it will be apparent that changes and modifications may be made without departing from the invention. The aim of the attended claims, therefore, is to cover all such changes and modifications included within the spirit and scope of the invention.

The embodiments of the invention in which an exclusive property or privilege is claimed are defined as follows:

1. A handlebar for a bicycle comprising in combination:
   a horizontal tubular mid section adapted to be connected to the stem of a bicycle fork;
   a pair of diverging arms extending upwardly from opposite ends of said tubular mid section and having handle members extending outwardly from the ends of said arms;
   a horizontal cross bar connecting said arms at a level intermediate the levels of said tubular mid section and said handle members;
   said tubular mid section, arms and cross bar being coplanar in an upright plane: and a flat upper surface on the cross bar to support a rider to facilitate performing freestyle maneuvers.

2. A handlebar for a bicycle according to claim 1 in which said flat upper surface is at right angles to an upright plane.

3. A handlebar for a bicycle according to claim 1 in which said flat upper surface is fixed at an oblique angle relative to an upright plane enabling said flat upper surface to be disposed in a horizontal plane when the handlebar is connected to the stem and tilted at said oblique angle relative to said upright plane.

4. A handlebar for a bicycle according to claim 1 in which said flat upper surface is fixed at an oblique angle relative to the plane of said tubular mid-section, arms and cross bar enabling said flat upper surface to be disposed in a horizontal plane when the handlebar is connected to the stem and tilted at said oblique angle relative to a vertical plane.

* * * * *